US012612903B2

(12) United States Patent
　　Spindler

(10) Patent No.:　US 12,612,903 B2
(45) Date of Patent:　Apr. 28, 2026

(54) COMPRESSOR ASSEMBLY FOR AN APPARATUS FOR INFLATING AND/OR REPAIRING INFLATABLE ITEMS OR PRODUCTS AS NEEDED

(71) Applicant: Illinois Tool Works Inc., Glenview, IL (US)

(72) Inventor: Martin Spindler, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/723,850

(22) PCT Filed: Jan. 6, 2023

(86) PCT No.: PCT/US2023/010281
§ 371 (c)(1),
(2) Date: Jun. 24, 2024

(87) PCT Pub. No.: WO2023/136988
PCT Pub. Date: Jul. 20, 2023

(65) Prior Publication Data
US 2025/0043777 A1　　Feb. 6, 2025

(30) Foreign Application Priority Data
Jan. 14, 2022　(DE) ..................... 10 2022 100 812.6

(51) Int. Cl.
　　B29C 73/02　　　(2006.01)
　　F04B 27/10　　　(2006.01)
　　　　　　(Continued)
(52) U.S. Cl.
　　CPC ........ F04B 27/1036 (2013.01); B29C 73/025 (2013.01); F04B 37/12 (2013.01); B29L 2030/00 (2013.01)

(58) Field of Classification Search
　　CPC .............................. F04B 41/06; B29C 73/166
　　See application file for complete search history.

(56) References Cited

U.S. PATENT DOCUMENTS

| | | | |
|---|---|---|---|
| 10,926,495 B2 | 2/2021 | Spindler | |
| 2010/0108185 A1* | 5/2010 | Chou | F04B 35/06 417/415 |

(Continued)

FOREIGN PATENT DOCUMENTS

| | | |
|---|---|---|
| DE | 102008023594 A1 | 11/2009 |
| DE | 102008057826 A1 | 6/2010 |

(Continued)

OTHER PUBLICATIONS

Yang (CN108150381A) and machine translation (Year: 2018).*

(Continued)

*Primary Examiner* — Timothy P. Kelly
(74) *Attorney, Agent, or Firm* — McAndrews, Held & Malloy, Ltd.

(57) ABSTRACT

The invention relates to a compressor assembly (1) for an apparatus (100) for inflating and/or repairing inflatable items or products as needed, in particular vehicle tires. The compressor assembly (1) comprises a first compressor unit (2) having a compressed air outlet (5) via which the air compressed by the first compressor unit (2) is supplied. The compressor assembly (1) further comprises at least one further second compressor unit (3, 4) having a compressed air outlet (6, 7) via which the air compressed, in particular as needed, by the second compressor unit (3, 4) is supplied as compressed air. The first compressor unit (2) and the at least one second compressor unit (3, 4) are fluidly switched in parallel.

14 Claims, 6 Drawing Sheets

Figure 1:
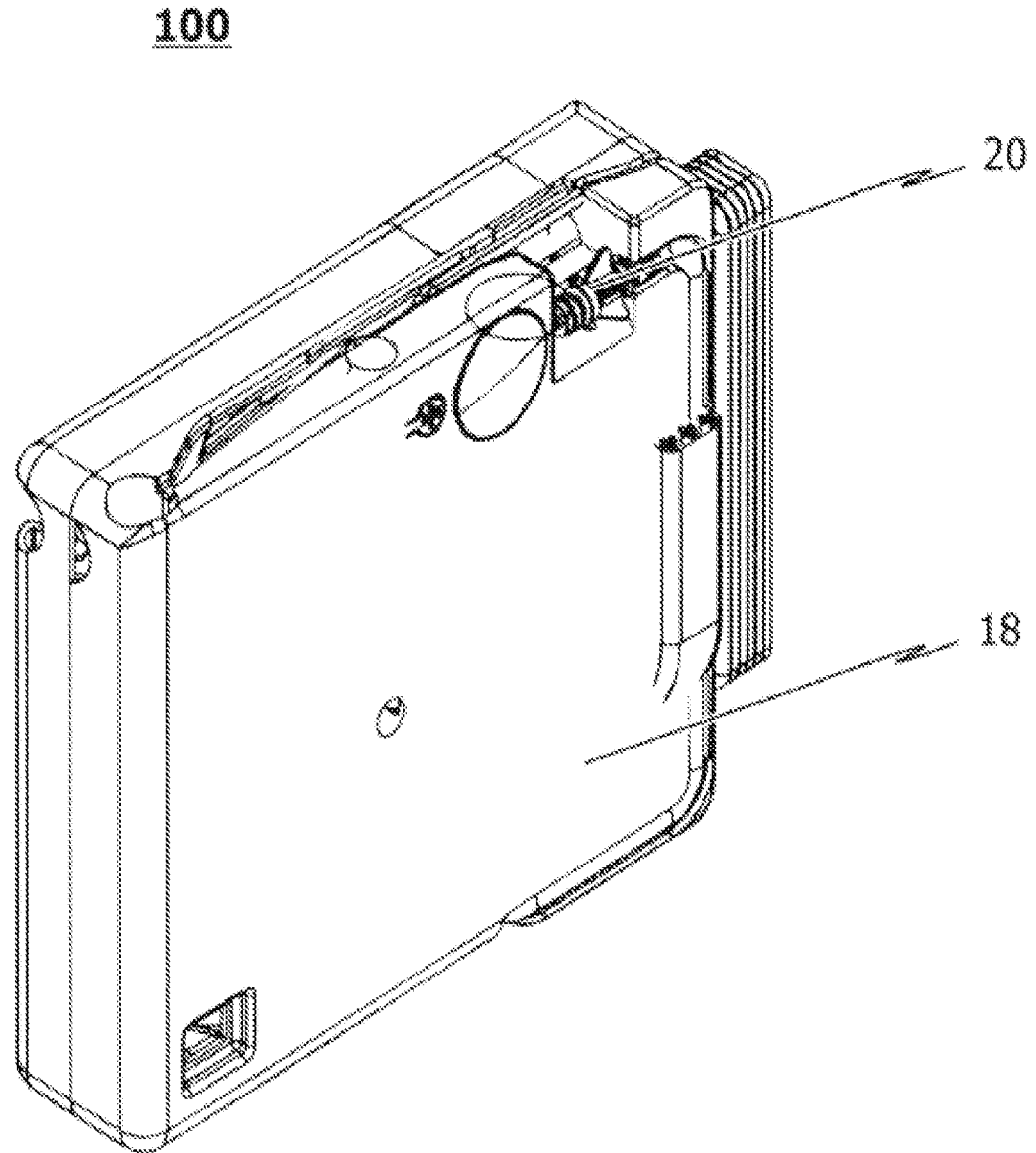

(51) Int. Cl.
    *F04B 37/12*    (2006.01)
    *B29L 30/00*    (2006.01)

(56)                 References Cited

U.S. PATENT DOCUMENTS

| 2014/0000736 | A1 | 1/2014 | Ellis |
| 2019/0023091 | A1 | 1/2019 | Spindler |
| 2021/0016616 | A1 | 1/2021 | Chou |

FOREIGN PATENT DOCUMENTS

| DE | 102014100815 | A1 | 7/2014 |
| EP | 3306089 | A1 | 4/2018 |
| WO | 2014154046 | | 10/2014 |

OTHER PUBLICATIONS

International Search Report and Written Opinion, with a mailing date of May 23, 2023, in International application No. PCT/US2023/010281, filed on Jan. 6, 2023 (8 pages).

\* cited by examiner

100

COMPRESSOR ASSEMBLY FOR AN APPARATUS FOR INFLATING AND/OR REPAIRING INFLATABLE ITEMS OR PRODUCTS AS NEEDED

CROSS REFERENCE TO RELATED APPLICATIONS

This application is a 371 of International Patent Application No. PCT/US2023/010281, filed Jan. 6, 2023, which claims benefit of German Patent Application No. 10 2022 100 812.6, filed to the German Patent Office on Jan. 14, 2022, entitled "Compressor Assembly for an Apparatus for Inflating and/or Repairing Inflatable Items or Products as Needed," contents of both of which are hereby incorporated by reference in their entirety.

The present invention relates generally to tire repair kits and, in particular, to apparatuses for dispensing tire sealants from a container by way of a compressed air source.

Tire sealants or sealing liquids for quickly repairing inflatable items or products are known as such. The liquid is introduced into the product or item for repair by means of compressed air, in particular by means of a compressor, penetrates all holes or slits in the product or item, and hardens through contact with air, thereby quickly sealing the product or item.

Such sealing liquids are widely used for the rapid repair of tires. The following description relates to these circumstances. However, the description is purely exemplary, is focused on clarity, and is not intended to be limiting.

Spare tires for vehicles raise a number of well-known problems, not the least of which are their notable size and weight. In particular, when the spare tire is accommodated inside the vehicle, the capacity of the trunk is noticeably reduced, and the tire is difficult to loosen or remove, in particular when the trunk is full.

Therefore, for passenger cars, so-called tire repair kits have become common, which are used instead of a spare tire.

This is a built-in kit for repairing and inflating tires comprising a small compressor and a container for a sealing liquid, wherein this built-in kit can be easily accommodated in a special compartment or in the trunk of the car.

In addition to the noticeable size and weight reduction, the repair of a tire in the event of a flat tire has been proven to be faster and easier: unlike changing the vehicle tire, the compressor can be easily connected to a power outlet on the vehicle, wherein the container for the sealing liquid is then connected to the compressor as well as to the valve of the tire in order to carry out the repair.

Compressed air is forced into the container with the sealing liquid by means of the compressor, and the sealing liquid is then pumped into the defective tire via a valve through the corresponding rising pipes. Thereafter, the valve can be switched so that the tire can now be inflated by means of the compressor. Standard functions from the prior art are such that either only air is pumped, for example in order to inflate balls or air mattresses, or an air pressure control is carried out. In the repair function, the prior art is designed such that the sealant input and the air occurs in one pass.

As already stated, such tire repair kits have become common, in particular in passenger cars. The use of conventional tire repair kits is problematic for larger vehicles, for example vans or commercial trucks, with an allowable total weight of up to 7.5 t.

Such vehicles are typically equipped with tires having a relatively high tire volume. For a repair of such a vehicle tire having a high tire volume, the tire repair kits known from the prior art and designed for passenger cars can only be used to a limited extent, because the compressor of the known tire repair kits is not configured to fill a high tire volume at a relatively high pressure in a relatively short time.

In principle, it would be conceivable to increase the compressor in a conventional tire repair kit for passenger cars, in order to thus inflate vehicle tires with a high tire volume even in a relatively short time. However, enlarging the compressor would result in a noticeable increase in the size and weight of the tire repair kit.

Accordingly, the problem addressed by the invention is to further develop a tire repair kit of the aforementioned type such that it can be flexibly implemented for passenger car tires and truck tires, while keeping the size and weight of the entire apparatus as low as possible.

This problem is solved in particular by the subject-matter of the claim, which relates to a special compressor assembly for an apparatus for inflating and/or repairing inflatable items or products, in particular vehicle tires, as needed.

Advantageous further developments of the compressor assembly according to the invention are specified in the dependent claims.

The invention further relates to an apparatus, in particular one configured as a tire repair kit, for inflating and/or repairing inflatable items or products as needed, in particular vehicle tires, wherein advantageous further developments of the apparatus configured as a tire repair kit are specified in the dependent claims.

Accordingly, the invention relates in particular to a compressor assembly for an apparatus for inflating and/or repairing inflatable items or products, in particular vehicle tires, as needed, wherein the compressor assembly comprises a first compressor unit for the compression of air, in particular as needed. The first compressor unit comprises a compressed air outlet via which the air that is compressed, in particular as needed, by the first compressor unit is supplied or suppliable as compressed air.

The compressor assembly according to the invention is characterized in particular in that, in addition to the first compressor unit, the compressor assembly comprises at least one further second compressor unit for the compression of air, in particular as needed, wherein the second compressor unit comprises a compressed air outlet via which the air that is compressed, in particular as needed, by the second compressor unit is supplied or suppliable as compressed air.

According to a particular aspect of the invention, it is provided that the first compressor unit and the at least one second compressor unit of the compressor assembly are fluidly switched in parallel, or fluidly switchable in parallel as needed. The compressor assembly further comprises a manifold to which the compressed air outlet of the first compressor unit and the compressed air outlet of the at least one second compressor unit are fluidly connected or connectable.

The advantages achievable with the solution according to the invention are obvious: due to the fact that the compressor assembly comprises compressor units that are switched or switchable in parallel, the flow rate of the compressor assembly can be easily increased, namely by switching on one of the at least two compressor units. By switching the respective compressor units on and off, an incremental regulation of the flow is achievable, in particular.

In this way, a compressor assembly is provided that is configured so as to inflate vehicle tires with a high tire volume at a relatively high pressure in a relatively short time despite having a compact design. At the same time, the compressor assembly is also suitable as a "classic" compressor for tire repair kits for passenger car tires.

A further advantage of the compressor assembly according to the invention can be seen in that the failure, functional, and operational safety of the compressor assembly is increased by the provision of a plurality of redundantly operable compressor units. The functional redundancy achieved thereby aims to ensure that, if a compressor unit fails, the at least one further compressor unit can still provide compressed air for the manifold of the compressor assembly.

According to implementations of the compressor assembly according to the invention, it is provided that a connecting element, in particular configured as a T-piece, is associated with the compressed air outlet of the first compressor unit. This connecting element, in particular configured as a T-piece, comprises a first connector fluidly connected or connectable to the compressed air outlet of the first compressor unit and a cable harness fluidly connected or connectable to the first connector, having an upstream second connector and a downstream third connector.

It is similarly helpful in this context that the compressed air outlet of the second compressor unit is likewise associated with a connecting element, in particular one that is configured as a T-piece, wherein the connecting element comprises a first connector fluidly connected or connectable to the compressed air outlet of the second compressor unit and a cable harness fluidly connected or connectable to the first connector, having an upstream second connector and a downstream third connector.

This configuration has the advantage that the individual compressor units can be modularly connected to one another.

For example, it is conceivable that the upstream second connector of the connecting element associated with the compressed air outlet of the first compressor unit is configured so as to form, via a coupling element, in particular a quick-action coupling element, a fluid connection with the downstream third connector of the connecting element associated with the compressed air outlet of the at least one second compressor unit.

Alternatively or in addition thereto, it can be provided that the upstream second connector of the connecting element associated with the compressed air outlet of the second compressor unit is configured so as to form via a coupling element, in particular a quick-action coupling element, a fluid connection with the downstream third connector of the connecting element associated with the compressed air outlet of the first compressor unit.

In this way, a series of more than two compressor units is also fluidly switchable in parallel.

For example, it is conceivable that the compressor assembly comprises a first second compressor unit and at least one second second compressor unit, wherein the upstream second connector of the connecting element associated with the compressed air outlet of the first second compressor unit is configured so as to form via a coupling element, in particular a quick-action coupling element, a fluid connection with the downstream third connector of the connecting element associated with the compressed air outlet of the at least one second second compressor unit.

Alternatively or in addition thereto, it can be provided that the upstream second connector of the connecting element associated with the compressed air outlet of the at least one second second compressor unit is configured so as to form, via a coupling element, in particular a quick-action coupling element, a fluid connection with the downstream third connector of the connecting element associated with the compressed air outlet of the first second compressor unit.

In the aforementioned design variants, it is advantageous that the coupling element, which is in particular configured as a quick-action coupling element, is configured in a self-sealing manner such that it closes, in particular automatically, when no corresponding connector of a connecting element of a compressed air outlet of an adjacent compressor unit is connected to the corresponding connector of the connecting element.

With respect to the manifold of the compressor assembly, it is provided according to the embodiments of the present invention that the manifold is formed at least in regions by the cable harness of the connecting element associated with the first compressor unit, said cable harness being fluidly connected to the cable harness of the connecting element associated with the at least one second compressor unit.

In order to be able to guarantee a redundant operation of the individual compressor units, it is provided according to a further aspect of the invention that the compressed air outlet of the first compressor unit is associated with a non-return valve, which is configured so as to permit a flow from the at least one second compressor unit in the direction of the manifold, wherein, upon reversing the flow direction, the non-return valve automatically closes and preferably also automatically opens when the flow direction is permitted.

In the same way, it is advantageous that the compressed air outlet of the at least one second compressor unit is also associated with a corresponding non-return valve, which is configured so as to permit a flow from the at least one second compressor unit in the direction of the manifold, wherein, upon reversing the flow direction, the non-return valve automatically closes and preferably also automatically opens when the flow direction is permitted.

According to implementations of the compressor assembly according to the invention, it is provided that the individual compressor units are actuatable separately from one another. For this purpose, the compressor assembly preferably comprises a corresponding control device, which is configured so as to control the first compressor unit and the at least one second compressor unit, in particular separately from one another.

According to further developments of this embodiment, it is provided that, for the operation of the first compressor unit, it is connected or connectable to a power supply, in particular an in-vehicle power supply, wherein, for the operation of the at least one second compressor unit, it is connected or connectable to the power supply, in particular the in-vehicle power supply.

In this embodiment, it is provided in particular that the control device is preferably configured so as to, depending in particular on the available capacity of the in particular in-vehicle power supply and/or depending in particular on the available performance of the in particular in-vehicle power supply, preferably automatically and more preferably optionally automatically, actuate the first compressor unit and/or the at least one second compressor unit.

In other words, in this configuration, the control device preferably automatically detects whether one and the same in-vehicle power supply can be utilized in order to operate the individual compressor units of the compressor assembly. An overloading of the in particular in-vehicle power supply is thus ruled out.

The first compressor unit and the at least one second compressor unit are preferably each in particular modular in design. It is helpful here that the first compressor unit and the at least one second compressor unit are accommodated in a common housing of the tire repair kit or the apparatus for inflating and/or repairing inflatable items or products as needed.

According to configurations of the compressor assembly according to the invention, it is provided that the first compressor unit is configured as a compressor with a piston compressor having a reciprocating piston pump unit.

In the same way, it is conceivable that the at least one compressor unit is configured as a compressor with a piston compressor having a reciprocating piston pump unit.

A reciprocating piston pump is a displacement pump for conveying fluids, in which the displacer (piston) performs a lifting motion, i.e., a straight-line (translational) motion.

Of course, other configurations of the compressor units are also conceivable, for example as an in-line pump, as a vibration pump, oscillating armature pump, or oscillating piston pump, or as an axial piston pump or radial piston pump.

The invention further relates to a compressor assembly for an apparatus, in particular configured as a tire repair kit, for inflating and/or repairing inflatable items or products as needed, in particular vehicle tires.

The apparatus according to the invention comprises in particular a compressor assembly of the aforementioned type according to the invention as well as a container with a sealing liquid, in particular with a tire sealant.

In this context, it is provided in particular that, as needed, a compressed air outlet of the manifold fluidly connected or connectable to the manifold of the compressor assembly is connected or connectable to the container or, in particular, directly to the inflatable item or product via an inlet valve.

For example, it is conceivable in this context that the apparatus further comprises a switching device, in particular a manually actuatable one, which is arranged fluidly between the compressor assembly and the sealing liquid container and is configured so as to optionally establish a fluid connection between the compressed air outlet of the manifold of the compressor assembly and the sealing liquid container or a fluid connection between the compressed air outlet of the manifold of the compressor assembly and the inflatable item or product, in particular via a corresponding inlet valve of the inflatable item or product.

According to implementations of the apparatus, configured in particular as a tire repair kit, it is provided that it comprises a housing in which the compressor assembly and the sealing liquid container are accommodated at least partially or in regions.

In particular, the apparatus according to the invention is configured as a tire repair kit for passenger car or truck tires and comprises a connector, which is fluidly connected or connectable as needed in a downstream direction directly to the compressed air outlet of the manifold of the compressor assembly or fluidly to an outlet of the sealing liquid container.

Exemplary embodiments of the solution according to the invention are described in further detail below with reference to the accompanying drawings.

Figure 2:
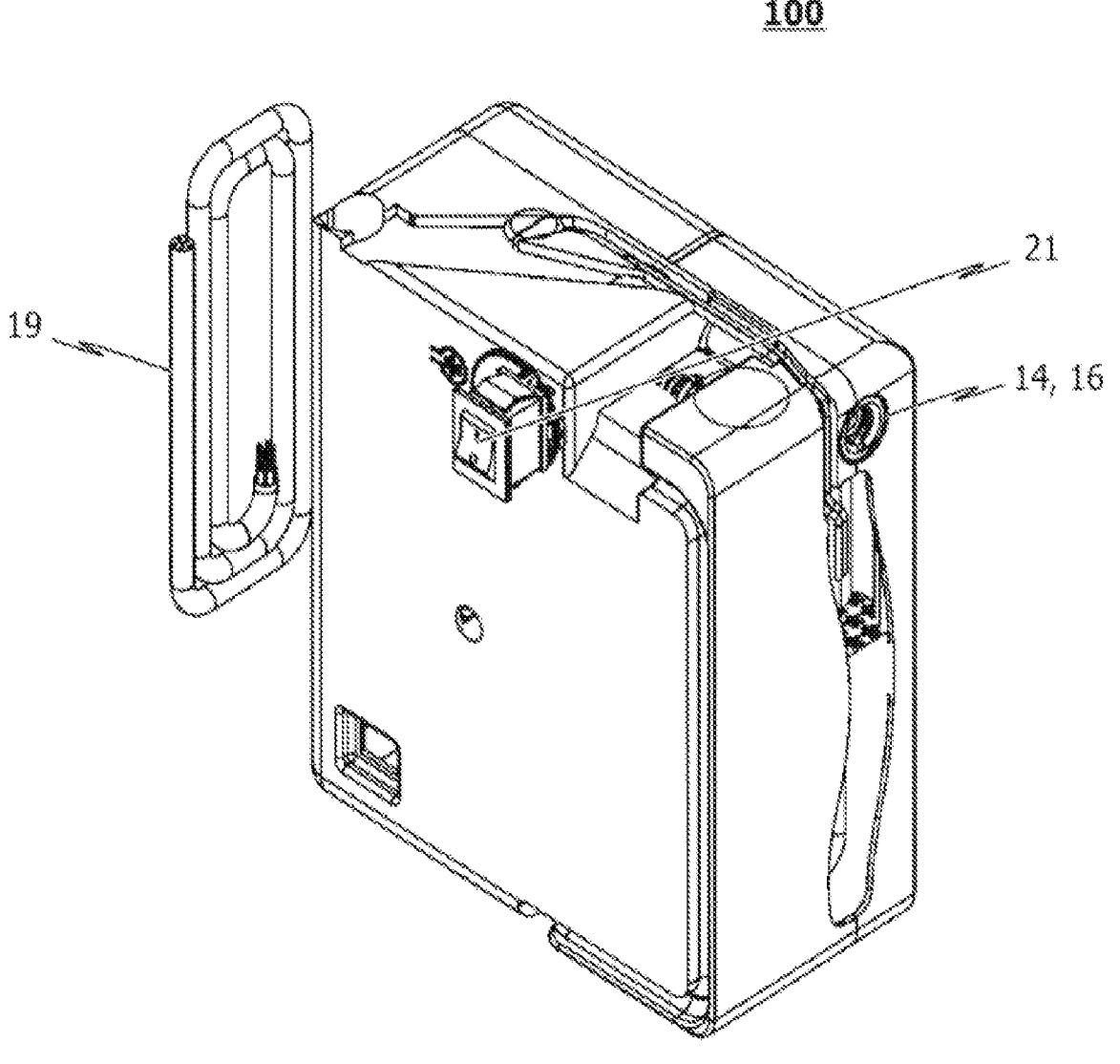
Figure 3:
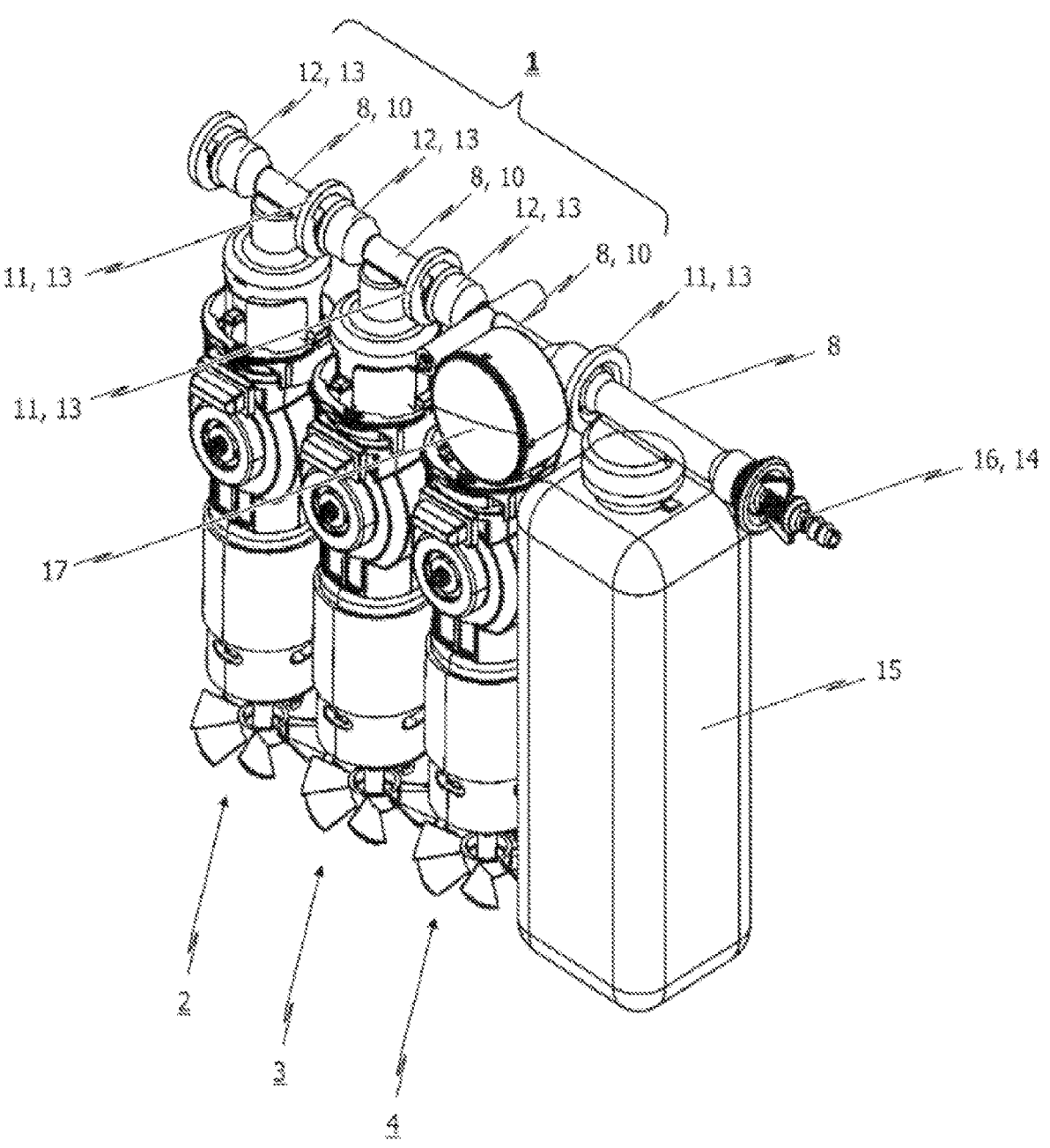
Figure 4:
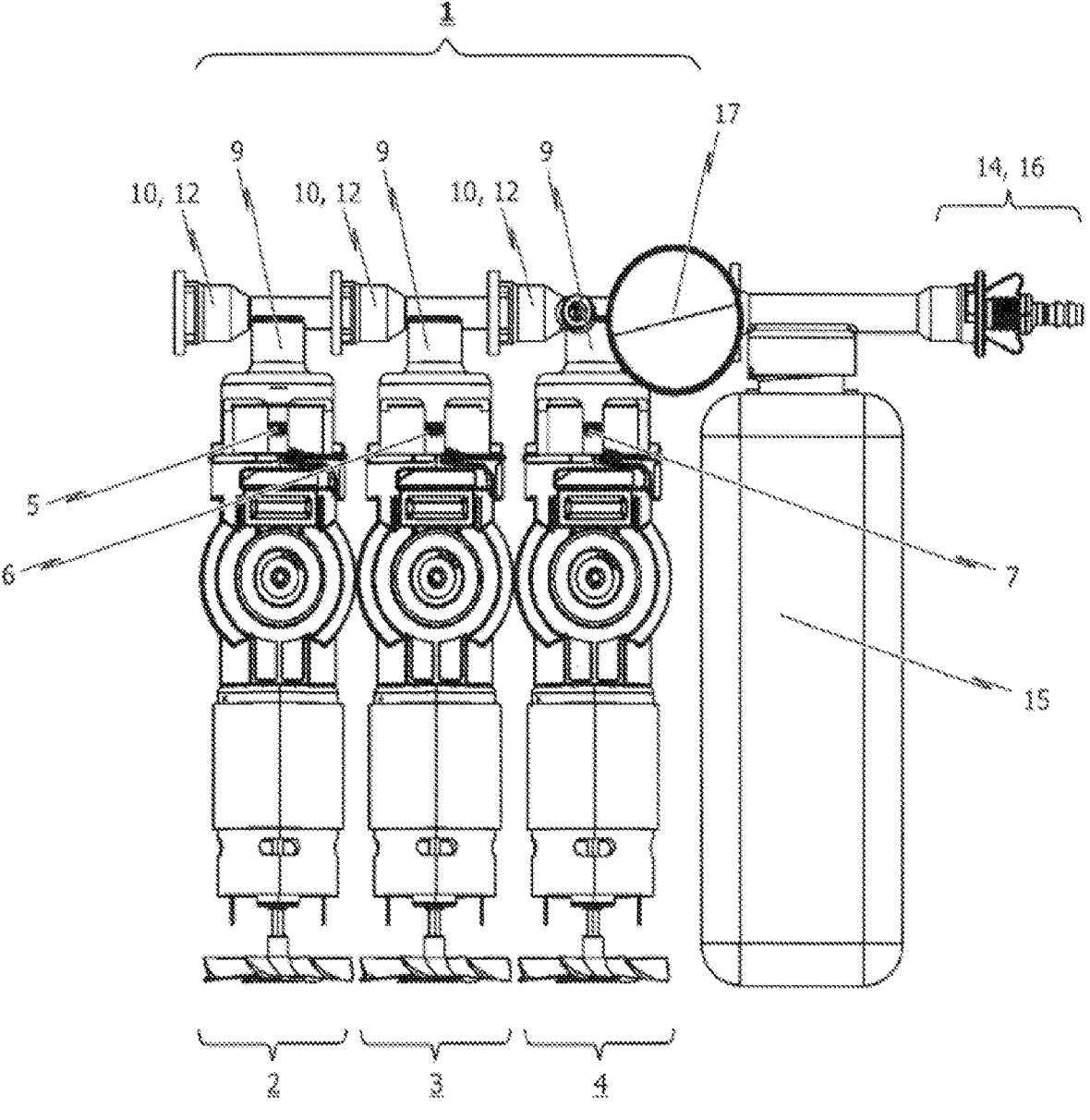
Figure 5:
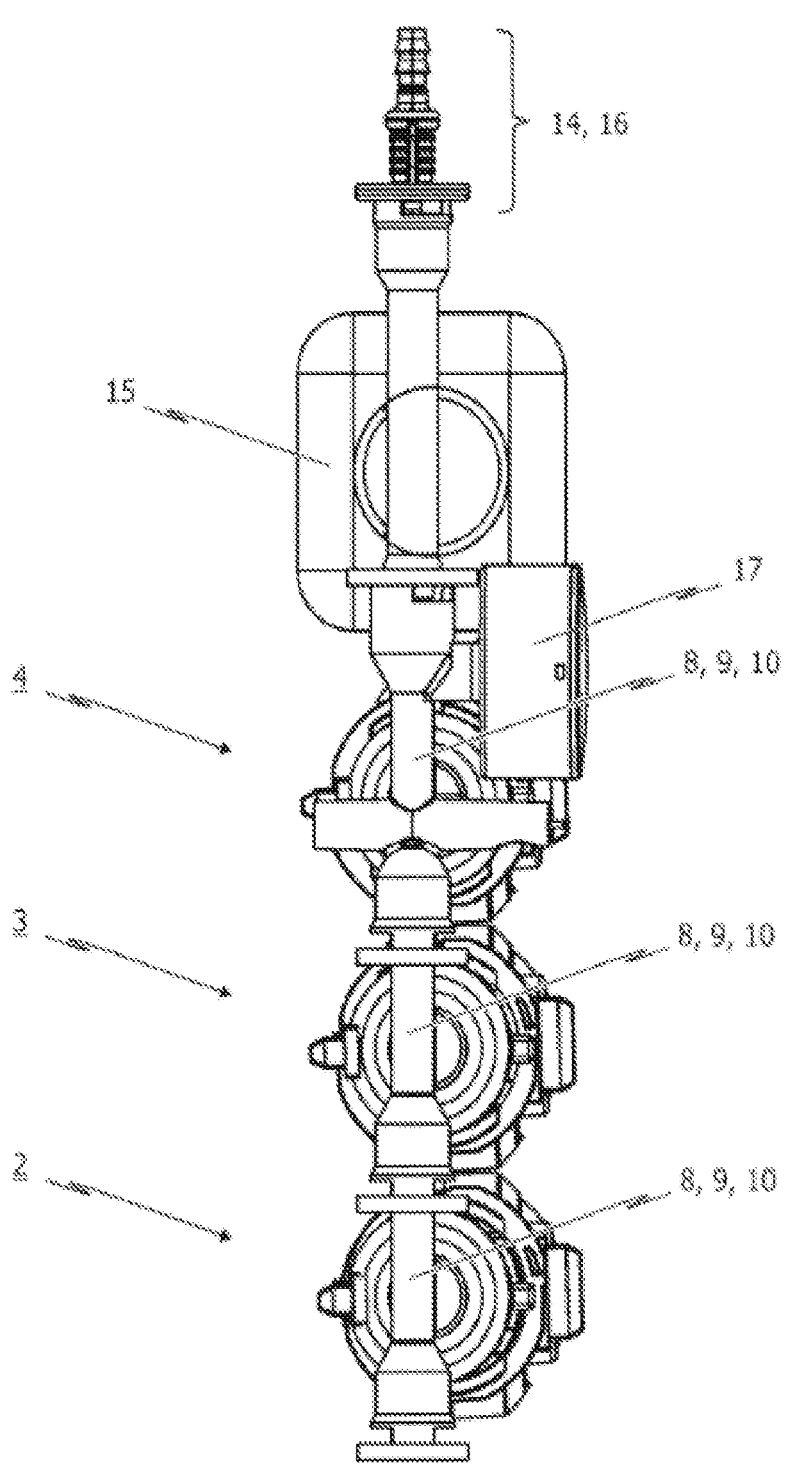
Figure 6:
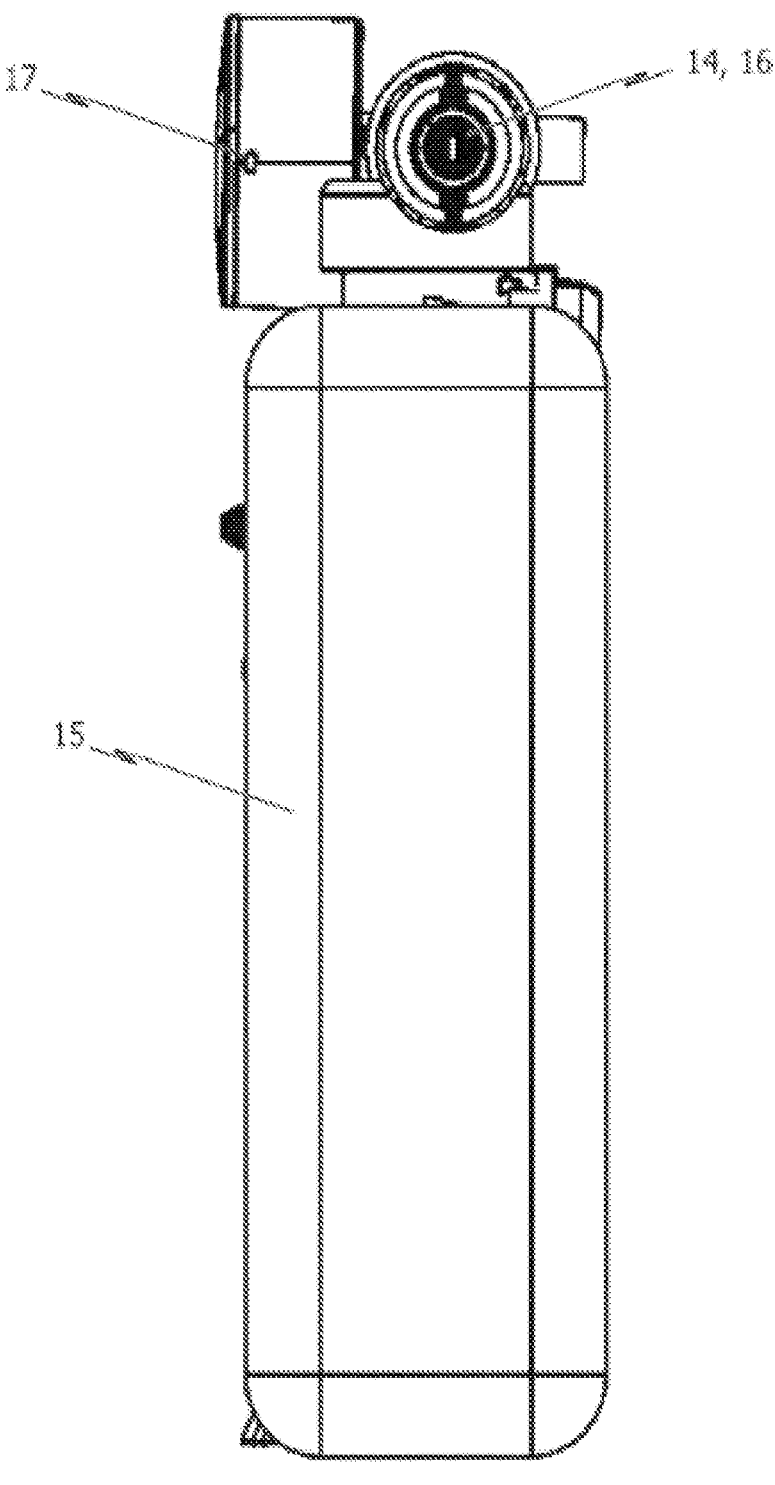

The following are shown:

FIG. 1 schematically, and in an isometric view, a first exemplary embodiment of the apparatus configured as a tire repair kit for inflating and/or repairing inflatable items or products, in particular, vehicle tires, as needed;

FIG. 2 schematically, and in an isometric view, a second exemplary embodiment of the apparatus configured as a tire repair kit for inflating and/or repairing inflatable items or products, in particular, vehicle tires, as needed;

FIG. 3 schematically, and in an isometric view, an exemplary embodiment of the compressor assembly according to the invention for the apparatus according to FIG. 1 or according to FIG. 2, wherein a sealing liquid container is connected to a manifold of the compressor assembly;

FIG. 4 schematically, and in a side view, the assembly according to FIG. 3;

FIG. 5 schematically, and in an aerial view, the assembly according to FIG. 3;

FIG. 6 schematically, and in a side view, onto the compressed air outlet of the manifold of the assembly according to FIG. 3.

The apparatus 100 according to the invention for inflating and/or repairing inflatable items or products, in particular vehicle tires, as needed according to FIG. 1 or according to FIG. 2 comprises a housing 18. This housing preferably consists substantially of an accommodating bowl and a cover. In the accommodating bowl, functional elements are provided in corresponding openings/cutouts. On the one hand, this is a switch 21 for switching the apparatus 100 on and off, a manometer (not shown in FIG. 1 and FIG. 2) for measuring the pressure built up by a compressor assembly described below, a pressure release button for discharging excess pressure, and a rotary knob of a switching device 17 for actuating a corresponding valve.

The apparatus 100 configured as a tire repair kit according to FIG. 1 and FIG. 2 further comprises a connecting tube 19 via which a compressed air outlet 14 of a manifold 8 of a compressor assembly 1 of the apparatus 100 or an outlet 16 of a sealing liquid container 15 of the apparatus 100 is connectable to the tire valve of a tire to be inflated or repaired (not shown in the drawings).

Furthermore, the apparatus 100 according to FIG. 1 or FIG. 2 comprises a power connector 20 having a cigarette connector coupling element, via which the apparatus 100 can be galvanically connected to an in particular in-vehicle power supply (vehicle battery) as needed.

A compressor assembly 1 is accommodated in the housing 18 of the apparatus 100, as shown schematically for example in FIG. 3. The compressor assembly 1 comprises a plurality of separate compressor units 2, 3, 4, which are each modular in design.

Furthermore, the assembly shown in FIG. 3 to FIG. 6, which is accommodated at least partially or in regions in the housing 18 of the apparatus 100, comprises a sealing liquid container 15.

The compressor assembly 1 of the assembly shown for example in FIG. 3 comprises a first compressor unit 2 for the compression of air, in particular as needed, wherein the first compressor unit 2 comprises a compressed air outlet 5 via which the air that is compressed, in particular as needed, by the first compressor unit 2 is supplied or suppliable as compressed air.

The compressor assembly 1 according to the assembly shown for example in FIG. 3, further comprises two further (second) compressor units 3, 4, which are also configured so as to compress air, in particular as needed. The two second compressor units 3, 4 are each associated with a compressed air outlet 6, 7, via which the air that is compressed, in particular as needed, by the compressor units 3, 4 is supplied or suppliable as compressed air.

For example, the compressor assembly 1 shown in FIG. 3 is characterized in that the individual compressor units 2, 3, 4 are fluidly switched in parallel.

Further, the compressor assembly 1 comprises a manifold 8 to which the compressed air outlet 5 of the first compressor unit 2, the compressed air outlet 6 of the second compressor unit 3, and the compressed air outlet 7 of the third compressor unit 4 are fluidly connected or connectable.

Specifically, as can be seen in particular in the side view according to FIG. 4 and the aerial view according to FIG. 5, the compressed air outlet 5 of the second compressor unit 2 is likewise associated with a connecting element 9 configured as a T-piece, wherein the connecting element 9 comprises a first connector fluidly connected or connectable to the compressed air outlet 5 of the first compressor unit 2 and a cable harness 10 fluidly connected or connectable to the first connector, having an upstream second connector 11 and a downstream third connector 12.

In the same way, a corresponding connecting element 9 is associated with the second compressor unit 3 as well as with the third compressor unit 4.

As can also be seen in particular from the illustrations in FIG. 4 and FIG. 5, the upstream second connector 11 of the connecting element 9 associated with the compressed air outlet 5 of the first compressor unit 2 is fluidly connected to the downstream third connector 12 of the compressed air outlet 6 of the second compressor unit 3 via a coupling element 13, which is in particular configured as a quick-action coupling element.

Moreover, the second upstream connector 11 of the connecting element 9 associated with the compressed air outlet 6 of the second compressor unit 3 is fluidly connected to the downstream third connector 12 of the compressed air outlet 7 of the third compressor unit 4 via a coupling element 13.

In this way, the individual compressor units 2, 3, 4 of the compressor assembly 1 are fluidly switched in parallel.

Although not set forth in detail in the drawings, it is helpful in this context that the coupling element 13, which is in particular configured as a quick-action coupling element, is configured in a self-sealing manner such that it closes, in particular automatically, when no corresponding connector (third connector 12, second connector 1[1]) of the connecting element 9 of a compressed air outlet 5, 6, 7 of an adjacent compressor unit 2, 3, 4 is connected to the corresponding connector (second connector 11, third connector 12) of the connecting element 9.

In the exemplary embodiment of the compressor assembly 1 according to the invention shown in the drawings, it is provided that the manifold 8 of the compressor assembly 1 is formed at least in regions by the cable harnesses 10 of the corresponding connecting elements 9 of the compressor units 2, 3, 4, said cable harnesses being fluidly connected to one another.

Although not explicitly shown in the drawings, it is advantageous that the compressed air outlet 5, 6, 7 of the corresponding compressor unit 2, 3, 4 is associated with a respective non-return valve, which is configured so as to permit a flow from the corresponding compressor unit 2, 3, 4 in the direction of the manifold 8, wherein, upon reversing the flow direction, the non-return valve automatically closes and preferably also automatically opens (only) when the flow direction is permitted.

Preferably, the compressor assembly 1 is associated with a control device not shown in the drawings, which is configured so as to actuate the individual compressor units 2, 3, 4 of the compressor assembly, in particular separately from one another.

In this context, it is conceivable in particular that the respective compressor units 2, 3, 4 are connected or connectable to an in particular in-vehicle power supply. The control device is configured in particular so as to, depending in particular on the available capacity of the power supply and/or depending in particular on the available performance of the power supply, preferably automatically actuate the individual compressor units 2, 3, 4 of the compressor assembly 1.

In the embodiments shown in the drawings, the respective compressor units are configured as compressors with a piston compressor having in particular a reciprocating piston pump unit.

In addition to the compressor assembly 1, the assembly shown in FIG. 3 to FIG. 6 comprises a sealing liquid container 15, i.e., a container holding a sealing liquid, in particular a tire sealant. Here, it is provided in particular that, as needed, a compressed air outlet of the manifold 8 fluidly connected or connectable to the manifold 8 of the compressor assembly 1 is connected or connectable to the sealing liquid container 15 or, in particular, directly to the inflatable item or product via an inlet valve.

From the illustrations in FIG. 3 to FIG. 5, it can further be seen that the apparatus 100 comprises for this purpose a switching device 17, in particular a manually actuatable one, which is arranged fluidly between the compressor assembly 1 and the sealing liquid container 15 and is configured so as to optionally establish a fluid connection between the compressed air outlet 14 of the manifold 8 of the compressor assembly 1 and the sealing liquid container 15 or a fluid connection between the compressed air outlet 14 of the manifold 8 of the compressor assembly 1 and the inflatable item or product (in particular via an inlet valve of the inflatable item or product).

The invention is not limited to the embodiments shown in the drawings, but results when all of the features disclosed herein are considered together.

LIST OF REFERENCE NUMERALS

1 Compressor assembly
2 First compressor unit
3 Second compressor unit
4 Third compressor unit
5 Compressed air outlet of the first compressor unit
6 Compressed air outlet of the second compressor unit
7 Compressed air outlet of the third compressor unit
8 Manifold of the compressor assembly
9 Connecting element
10 Cable harness of the connecting element
11 Second (upstream) connector of the cable harness of the connecting element
12 Third (downstream) connector of the cable harness of the connecting element
13 Coupling element
14 Compressed air outlet of the manifold of the compressor assembly
15 Sealing liquid container
16 Outlet of the sealing liquid container
17 Switching device
18 Housing
19 Connecting tube
20 Power connector
21 Switch
100 Apparatus for inflating and/or repairing inflatable items or products as needed, or tire repair kit

The invention claimed is:
1. A compressor assembly for an apparatus for inflating and/or repairing inflatable items, wherein the compressor assembly comprises the following:
 a first compressor unit of configured to compress air, wherein the first compressor unit comprises a com- pressed air outlet via which the air that is compressed is suppliable as compressed air by the first compressor unit; and at least one further compressor unit configured to compress air, wherein the at least one further compressor unit comprises a compressed air outlet via which the air is suppliable as compressed air by the at least one further compressor unit, wherein the first compressor unit and the at least one at least one further compressor unit are fluidly switchable in parallel, wherein the compressor assembly further comprises a manifold to which the compressed air outlet of the first compressor unit and the compressed air outlet of the at least one further compressor unit are fluidly connected, wherein the compressed air outlet of the first compressor unit is associated with a first connecting element, wherein the compressed air outlet of the second compressor unit is associated with a second connecting element, and wherein the first connecting element and/or the second connecting element is configured to couple to an adjacent connecting element via a quick-action coupling element, wherein the quick-action coupling element is configured in a self-sealing manner such that it closes-automatically when no corresponding connector of a connecting element of a compressed air outlet of an adjacent compressor unit is connected to the corresponding connector of the connecting element.

2. The compressor assembly according to claim 1, wherein the first connecting element is configured as a T-piece, wherein the first connecting element comprises a first connector fluidly connected or connectable to the compressed air outlet of the first compressor unit and a cable harness fluidly connected or connectable to the first connector, having an upstream second connector and a downstream third connector, and wherein the second connecting element is configured as a T-piece, wherein the second connecting element comprises a first connector fluidly connected or connectable to the compressed air outlet of the second compressor unit and a cable harness fluidly connected or connectable to the first connector, having an upstream second connector and a downstream third connector.

3. The compressor assembly according to claim 2, wherein the upstream second connector of the first connecting element associated with the compressed air outlet of the first compressor unit is configured so as to form via a the quick-action coupling element, a fluid connection with the downstream third connector of the second connecting element associated with the compressed air outlet of the at least one second compressor unit; and/or wherein the upstream second connector of the second connecting element associated with the compressed air outlet of the second compressor unit is configured so as to form via a quick-action coupling element, a fluid connection with the downstream third connector of the connecting element associated with the compressed air outlet of the first compressor unit.

4. The compressor assembly according to claim 2, wherein the compressor assembly comprises a first at least one further compressor unit and a second at least one further compressor unit, wherein the upstream second connector of the connecting element associated with the compressed air outlet of the first second compressor unit is configured so as to form via a quick-action coupling element, a fluid connection with the downstream third connector of the connecting element associated with the compressed air outlet of the second at least one further compressor unit; and/or wherein the upstream second connector of the connecting element associated with the compressed air outlet of the second at least one further compressor unit is configured so as to form, via a quick-action coupling element, a fluid connection with the downstream third connector of the connecting element associated with the compressed air outlet of the first at least one further compressor unit.

5. The compressor assembly according to claim 2, wherein the manifold of the compressor assembly is formed at least in regions by the cable harness of the connecting element associated with the first compressor unit, said cable harness being fluidly connected to the cable harness of the connecting element associated with the at least one second compressor unit.

6. The compressor assembly according to claim 1, wherein the compressed air outlet of the first compressor unit is associated with a non-return valve, which is configured so as to permit a flow from the first compressor unit in the direction of the manifold, wherein, upon reversing the flow direction, the non-return valve is configured to automatically close and automatically open when the flow direction is permitted; and/or wherein the compressed air outlet of the at least one further compressor unit is associated with a non-return valve, which is configured so as to permit a flow from the at least one further compressor unit in the direction of the manifold, wherein, upon reversing the flow direction, the non-return valve is configured to automatically close and automatically open when the flow direction is permitted.

7. The compressor assembly according to claim 1, wherein the compressor assembly comprises a control device, which is configured so as to control the first compressor unit and the at least one further compressor unit separately from one another.

8. The compressor assembly according to claim 7, wherein, for the operation of the first compressor unit, it is connected or connectable to a power supply, wherein the power supply is an in-vehicle power supply, and wherein, for the operation of the at least one further compressor unit, it is connected or connectable to the power supply, wherein the control device is configured so as to, depending in particular on the available capacity of the power supply and/or depending on the available performance of the power supply, actuate the first compressor unit and/or the at least one further compressor unit.

9. The compressor assembly according to claim 1, wherein the first compressor unit and the at least one second compressor unit are each modular in design, and wherein the first compressor unit and the at least one further compressor unit are accommodated in a common housing of the apparatus for inflating and/or repairing inflatable items or products, as needed.

10. The compressor assembly according to claim 1, wherein the first compressor unit is configured as a compressor with a piston compressor having a reciprocating piston pump unit; and/or wherein the at least one second further compressor unit is configured as a compressor with a piston compressor having a reciprocating piston pump unit.

11. An apparatus for inflating and/or repairing inflatable items, wherein the apparatus comprises the following:

a compressor assembly according to claim 1; and a container having a sealing liquid, wherein it is provided that, as needed, a compressed air outlet of the manifold fluidly connected or connectable to the manifold of the compressor assembly is con- nected or connectable to the container or, directly to the inflatable item or product via an inlet valve.

12. The apparatus according to claim 11, wherein the apparatus further comprises a switching device, wherein the switching device is a manually actuatable one, which is arranged fluidly between the compressor assembly and the sealing liquid container and is configured so as to optionally establish a fluid connection between the compressed air outlet of the manifold of the compressor assembly and the sealing liquid container or a fluid connection between the compressed air outlet of the manifold of the compressor assembly and the inflatable item or product, via an inlet valve of the inflatable item or product.

13. The apparatus according to claim 11, wherein the apparatus comprises a housing in which the compressor assembly and the sealing liquid container are accommodated at least partially or in regions.

14. The apparatus according to claim 11, wherein the apparatus is configured as a tire repair kit for passenger car or truck tires and comprises a connector, which is fluidly connected or connectable as needed in a downstream direction directly to the compressed air outlet of the manifold of the compressor assembly or fluidly to an outlet of the sealing liquid container.

\* \* \* \* \*